June 5, 1962 J. R. DAVEY 3,038,035

TELEGRAPH SYSTEM-HUB COUPLING CIRCUIT

Filed Nov. 5, 1959 2 Sheets-Sheet 1

INVENTOR
J. R. DAVEY
BY John E. Cassidy
ATTORNEY

INVENTOR
J. R. DAVEY
BY John E. Cassidy
ATTORNEY 3,038,035
Patented June 5, 1962

3,038,035

TELEGRAPH SYSTEM-HUB COUPLING CIRCUIT

James R. Davey, Franklin Township, Somerset County, N.J., assignor to Bell Telephone Laboratories, Incorporated, New York, N.Y., a corporation of New York Filed Nov. 5, 1959, Ser. No. 851,168
1 Claim. (Cl. 178—73)

This invention is an improved telegraph hub repeater leg coupling unit circuit.

An object of the invention is an improved telegraph hub repeater leg coupling unit circuit.

Telegraph hub repeater transmission is a form of telegraph transmission in which a group of telegraph circuits over which there is need of frequent intercommunication, circuits connecting components of a single large corporation, for instance, are connected into an individual network, comprising a single hub concentration, or a number of hub concentrations, in such manner that a station connected to the hub network through any circuit may transmit to all of the others simultaneously. Each single hub concentration of the network, which may be located at a telegraph office in a particular city, for instance, in certain respects, resembles spokes connected to a hub. That is to say, the individual telegraph repeater circuits together with their individual hub coupling unit circuits resemble the spokes and the common terminal, to which all of the individual circuits are connected in parallel, resembles the hub. Such hub networks are generally half-duplex in operation. In half-duplex operation, generally only one patron's circuit may transmit effectively at a time and the signals transmitted through any patron's circuit to the hub pass through all of the other spokes or branches connected to the hub to all of the other components simultaneously. In the present circuit, when arranged for half-duplex operation generally, any two circuits may transmit effectively simultaneously one to another. During such operation other circuits receive garbled signals indicating the condition.

In most hub circuit networks, there will be hubs located in a number of different cities. Individual stations in the same local area will be interconnected together through a single hub in that local area. If the network requires connections to local stations in more than one area, as is usually the case, hubs will be established in each required area and the separate hubs will be interconnected together by means of a telegraph line circuit, which, so to speak, forms a spoke in each of the two hubs thus interconnected. Many large corporations, news services, airline companies and others are thus served by individual hub networks which comprise separate hubs in a number of different cities. Each of the components of such a hub network, connected to a concentration in a particular city, may transmit to all of the components of the network in all cities simultaneously. It should be understood that these networks are set up more or less on a semipermanent basis. The network, once established, may remain intact for weeks or months or longer. Changes, such as additions to, subtractions from or substitutions in the network may, of course, be made as required.

In such an arrangement as is described in the foregoing, it is essential that signals being transmitted toward the hub from a station through one of the spokes of the hub, should not be retransmitted back to its point of origin. Such retransmission from a hub back to the source of signals would mutilate the message being transmitted toward the hub. Each hub circuit branch is provided with means for preventing this retransmission from the hub back toward the source. Broadly, the way this is achieved is as follows.

In the foregoing, it was explained that the components connected to a hub resemble the spokes of a wheel. Actually, each of these circuits terminates in the hub in two individual conductors rather than in a single conductor. One of these two conductors is used to receive signals from its connected component and impress them on the hub. The other of the two branches is employed to transmit signals from the hub to its individual connected component. Since signals incoming to the hub, over a telegraph loop from a station or over a line from a hub in a different city, pass through an individual one of the two branches mentioned in the foregoing, called the receiving leg, to the hub, and signals outgoing from the hub pass through a second individual branch, called the sending leg, it is possible to introduce circuitry between the two branches which will prevent retransmission of signals incoming through a receiving branch back through its associated sending branch. This is achieved by means of what is known as an individual coupling unit for each component connected to each hub, which couples the receiving branch of each component to its associated sending branch. When signals are incoming toward the hub through the receiving branch, the coupling unit is effective to block the sending branch of the same circuit. All of the coupling units associated with circuits connected to a hub are thus arranged to prevent retransmission of signals back to their source. Each coupling unit is also arranged to unblock its associated sending leg when signals are incoming to the hub from any other circuit. Modern hub circuits are arranged in such manner that when more than one of the components connected into a hub network attempt to transmit simultaneously, all of the coupling units associated with all of the hubs unlock their associated sending legs so that garbled signals are transmitted to all stations in the network. This serves as an indication of the abnormal condition, for, as stated in the foregoing, only one message can be effectively transmitted through a hub network at any one time. However, the present circuit affords full duplex transmission between any two circuits in a manner to be described hereinafter.

Leg coupling units presently employed in hub telegraph systems are of two kinds. In the older circuits, electromechanical relays are employed. These have several disadvantages. One important disadvantage is that they are not fast enough in operation, particularly in hub networks connecting cities over great distances and occasionally short messages are lost. Another disadvantage is their cost, since they employ polar relays to perform the switching, and these are relatively expensive in first cost and expensive to maintain. Yet another disadvantage is the space required to mount the circuits. The newer coupling units employ space discharge devices. These have the advantage of being faster in operation and of requiring less space for mounting. However, it was found that in attempting to take full advantage of the smaller space required for mounting leg coupling units equipped with space discharge devices, a heat dissipation problem was introduced. Moreover, space discharge devices which are employed require power sources which take up considerable space. Thus the saving in space afforded by the more compact leg coupling units employing space discharge devices was under certain conditions lost, because special cooling facilities were required to care for the excessive heat which they produce when they are mounted in close proximity to take advantage of the smaller space which they require.

The industry has considered for some time that it would be desirable to employ a transistorized leg coupling unit in hub systems. A number of attempts have been made to produce a transistorized circuit to perform this function. However, it has not been possible, for various reasons, to produce a satisfactory transistorized leg coupling unit.

One of the difficulties encountered in producing a satisfactory transistorized leg coupling unit was due to the fact that the voltages which known transistors can withstand are of relatively low magnitude. Moreover, most known transistors, when in the so-called nonconducting condition, do, in fact, conduct current of significant magnitude, particularly when operating at temperatures slightly above normal which are encountered in usual operation.

In order to be effective, a leg coupling unit must apply a positive lock to a transmitting leg before any signal incoming over its associated receiving leg to a hub can reach the sending leg. If the lock is not applied almost instantly, a portion of the incoming signal will be erroneously transmitted back to the source, tending to garble the signals incoming to the hub. However, it is essential that a lock applied by any receiving leg to its associated sending leg should be instantly removed upon the application of signals to the hub from another branch. If this is not done, a signal or a portion of a signal will be lost. Since in passing over long distances, from New York to Los Angeles, for instance, the signals may be repeated at several intermediate hub points, the delays are cumulative and become the limiting factor in effective transmission.

The present transistorized leg coupling unit circuit obviates the disadvantages enumerated in the foregoing. Further, it has the important advantage that it affords substantial economy in first cost and in operation over any known effective leg coupling unit.

A feature of the invention is a transistor flip-flop circuit intermediate the receiving and sending legs of the hub coupling unit which affords a positive lock on the sending leg.

Another feature of the invention is a transistorized hub circuit leg coupling unit which employs a positive and negative power source of a single magnitude of potential only, thereby eliminating the need for a power source of a second magnitude of potential.

The invention may be understood from reference to the associated drawings which show a preferred embodiment of the invention and a modification thereof. It is to be understood that the invention may be practiced with circuits of other modified forms which, it is considered, will be suggested to those skilled in the art from reference to the following description. In the drawings.

*Transmission Inward to the Hub*

In the description to follow where magnitudes of constants are cited, it is to be understood that it is by way of example as an aid in understanding the invention.

The small circles with the + or − symbol therein represent grounded positive or negative battery, respectively, which may each be 130 volts, for instance.

The transistors employed are all npn transistors, which are two negative conducting semiconductor sections separated by a positive conducting semiconductor section. The base connection is made to the positive and the emitter and collector to the negative sections.

Figure 1:
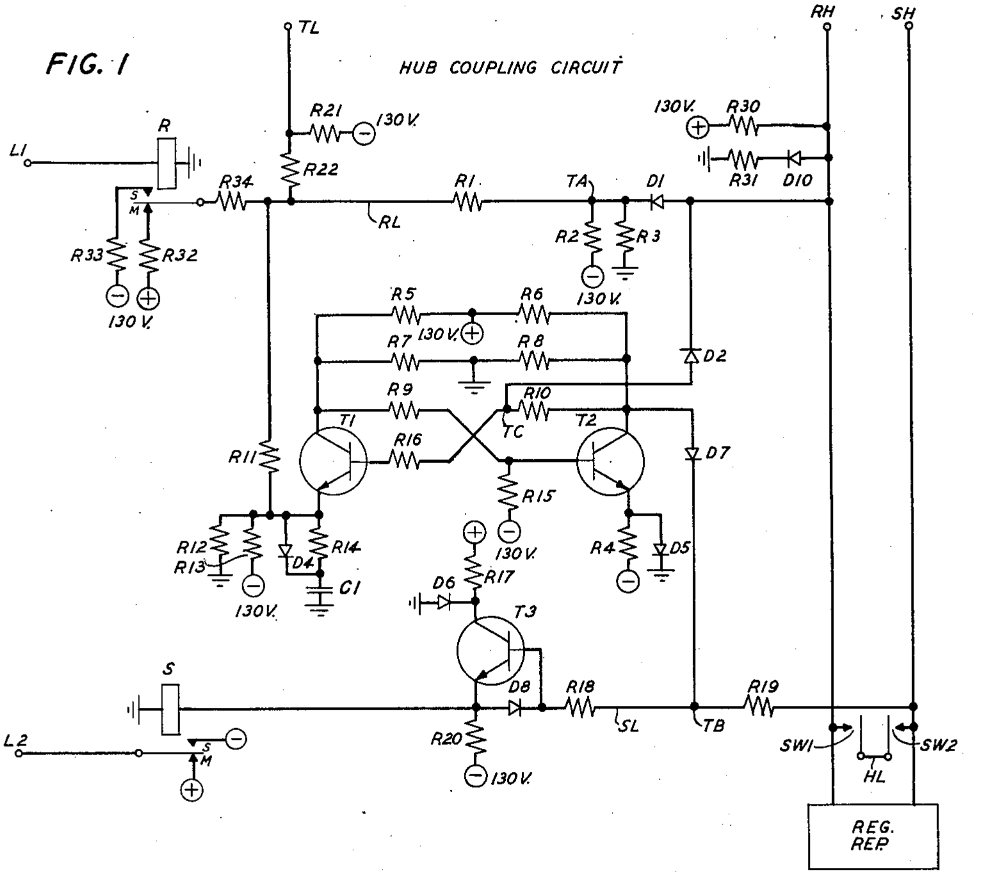
FIG. 1 shows a preferred embodiment of the present transistorized coupling unit circuit employing a transistor flip-flop circuit.
Figure 3:
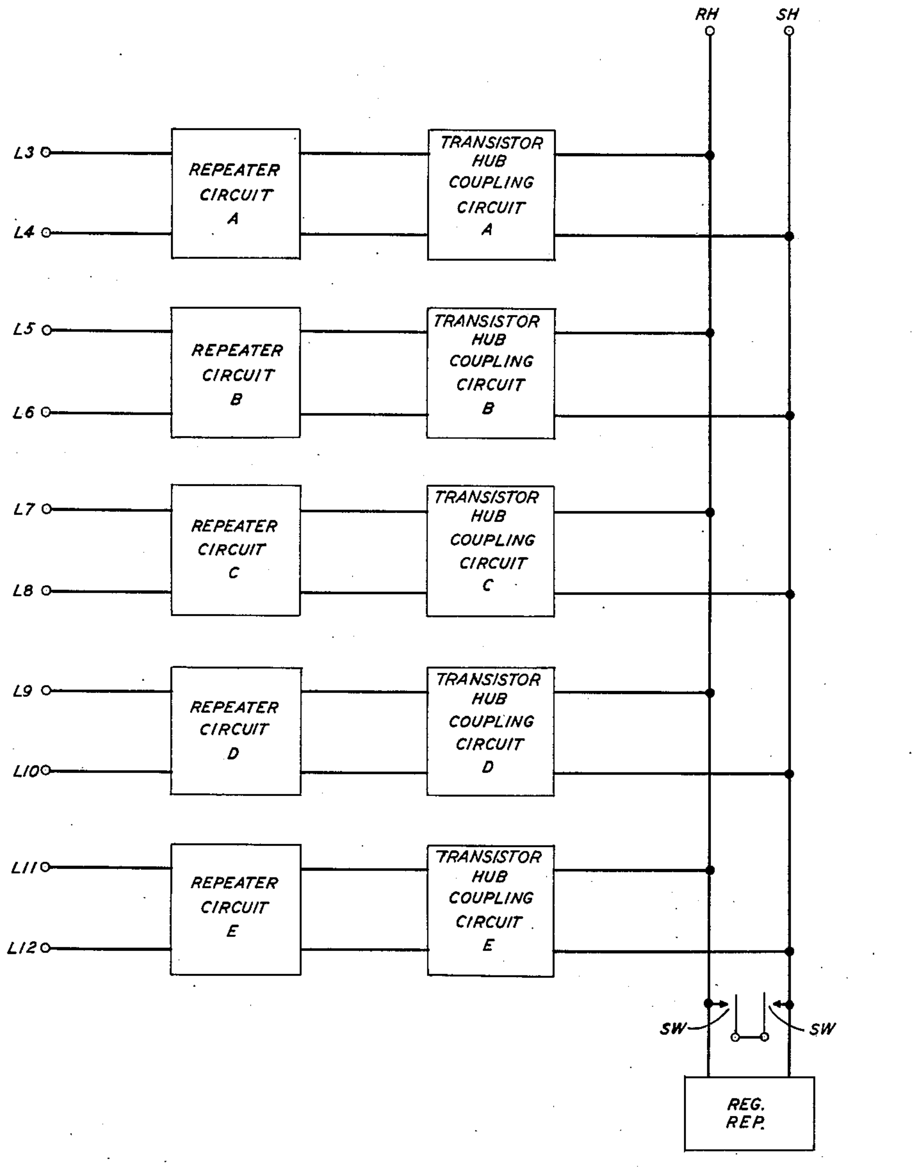
FIG. 3 shows a hub circuit concentration.

Refer now to FIG. 3. FIG. 3 shows a hub concentration of five telegraph circuits connected to a hub. Each of the five telegraph circuits has an individual receiving leg L3, L5, L7, L9 and L11, respectively, an individual sending leg L4, L6, L8, L10 and L12, respectively, an individual repeater circuit, repeater circuit A, B, C, D and E, respectively and an individual hub coupling circuit, hub coupling circuit A, B, C, D and E, respectively. The hub concentration has a single common receiving hub, RH, and a single common sending hub SH. The receiving hub RH and the sending hub SH may be connected together directly through the two single pole switches SW or may, if required, be connected through a regenerative repeater REG REP. The present arrangement differs from previous hub circuit concentrations in that the hub coupling circuits A, B, C, D and E are transistor circuits. Each of these transistor circuits is the same as shown in FIG. 1. It is to be understood that although FIG. 3 shows a hub concentration having five telegraph circuits connected thereto, there may be any number so connected from three to ten, or more.

Refer now to FIG. 1. FIG. 1 shows a single telegraph repeater, employing magnetic relays, connected through a single hub coupling unit circuit, employing transistors, to a hub. It is to be understood that a number of repeaters, each equipped with an individual coupling unit circuit, will be connected in practice to the common hub. The common hub is shown at the right. It comprises a receiving hub RH to which all of the receiving legs of the various circuits connected to the hub are connected. It also comprises a sending hub SH to which all of the sending legs of all the facilities connected to the hub are connected. A common potentiometer comprising resistors R30 and R31 and diode D10 is connected as shown between a source of positive potential and ground. The diode D10 is connected intermediate the inner terminals of the resistors and is poled in such a direction that it presents a low resistance to current of positive polarity. A connection is made from the junction between resistor R30 and the positive terminal of diode D10 to the common receiving hub. The receiving hub RH and the sending hub SH may, at times, be interconnected directly through switch SW1, hub link HL and switch SW2 to form a common electrical point or hub. At other times when regeneration of the incoming signals is required, the receiving hub and the sending hub are interconnected through a regenerative repeater REG REP. As is well known, when a regenerative repeater is employed, the signals incoming through any receiving leg to the receiving hub RH, are delayed for an interval equal in duration to about that of one-half of a normal signal interval before they appear on the sending hub SH for transmission through the sending legs. Signals incoming from the distant station, to which it is assumed the relay repeater shown in FIG. 1 is connected, are impressed through conductor L1 on relay R. These signals pass through the receiving leg RL to the common receiving hub RH. Signals transmitted from the sending hub SH through the coupling unit shown in FIG. 1, pass through the sending leg SL to relay S and are repeated by relay S and pass through conductor L2 toward the distant station. For a received marking signal, and while in the normal idle condition, relay R is in the released condition as shown. In this condition, the armature of relay R engages its marking contact M, and positive potential is impressed through resistor R32, marking contact M, armature of relay R and resistor R34 in the receiving leg RL. For a received spacing signal, the armature of relay R is actuated to engage its upper or spacing contact S. This connects the source of negative potential through resistor R33, spacing contact S, armature of relay R and resistor R34 in the receiving leg RL. From resistor R34, the receiving leg RL extends through resistor R1 and diode D1 to the common receiving hub RH. Intermediate resistor R1 and diode D1 a potentiometer is connected to the receiving leg. This may be traced from a source of negative battery through resistor R2, terminal TA in receiving leg RL and resistor R3 to ground. For the marking condition, terminal TA in the receiving leg assumes a potential, which may be positive 65 volts, for instance. For the marking condition, the receiving hub RH is held at the normal marking voltage of positive 60 volts, for instance, by the hub potentiometer. For this condition, therefore, with positive 65 volts connected to terminal TA and positive 60 volts connected to the receiving hub, diode D1 is in its high resistance condition, or is backbiased, as this condition is termed. As a result of this, the receiving leg RL is effectively isolated from the receiving hub.

When a spacing signal is received by relay R, and the negative source is connected through its spacing contacts, terminal TA appears as a source of negative potential, which may be, for instance, negative 104 volts and 2467 ohms. For this condition, diode D1 conducts. When diode D1 conducts, a current of 30 milliamperes, for instance, is drawn from the receiving hub potentiometer, and the potential of the receiving hub drops to negative 30 volts, for instance. To anticipate, if spacing signals are obtained simultaneously from two relays, such as relay R, a current of 18 milliamperes is drawn from the receiving hub through each receiving leg, and the potential of the receiving hub falls to negative 60 volts, for instance. This is known as the double-space condition.

A source of negative potential is connected through resistors R21 and R22 to the junction between resistors R34 and R1. From the junction of resistors R21 and R22, a conductor TL extends to a switchboard, known as the telegraph service board, to control an indicator thereat.

*Transmission Outward From the Hub*

The positive 60-volt marking signals and the negative 30-volt spacing signals appearing on the common receiving hub RH are transmitted to the sending hub SH by means of the hub link HL or by way of the regenerative repeater. The regenerative repeater, at its output, reproduces the positive 60-volt marking signals and the negative 30-volt spacing signals after a delay of one half of a signal element.

The signals appearing on the common sending hub SH are applied in parallel to the sending legs of all of the hub coupling circuits connected to the hub. As will be described later, the outward path through the sending leg SL of any coupling unit which is receiving a spacing signal through the receiving leg RL of the same coupling unit will be blocked so as to prevent the reflection of the incoming spacing signals back to the source where they originated. When a positive 60-volt marking signal appears on the sending hub, current flows through resistors R19 and R18 to the base of transistor T3 causing it to conduct, and a current of 14 milliamperes, for instance, flows from a source of positive potential through resistor R17, the collector and emitter of transistor T3 and the winding of relay S in the connecting repeater to ground. This current is opposed by a current, which may be 7 milliamperes, for instance, from a source of negative potential, through resistor R20 and the winding of relay S to ground. As a result of this, a net marking current, which may be positive 7 milliamperes, for instance, operates the armature of relay S to engage its marking contact M and transmits a marking signal to the distant terminal.

In the case of a spacing signal received through any receiving leg other than the one in the same hub coupling unit, when the sending hub assumes the negative 30-volt spacing condition, which is applied through resistors R19 and R18 to the base of transistor T3, transistor T3 is placed in its low conducting condition. The positive current through resistor R17 and the collector and emitter path through transistor T3 is cut off. The flow of the negative 7-milliampere current through resistor R20 continues through the winding of relay S, and the armature of relay S is actuated to its spacing contact S thus transmitting a spacing signal to the distant terminal.

Diode D6 is a back-biased Zener diode, well known in the art, which breaks down and limits the collector voltage of transistor T3 to a safe value, such as to 30 volts, for instance. Diode D8 conducts to prevent excessive back bias on the emitter of transistor T3 during the spacing condition.

The normal voltages at terminal TB in the sending leg are positive 12 volts for the marking condition and negative 6 volts for the spacing condition. When a spacing condition is to blocked from cutting off transistor T3 a potential of positive 12 volts from the collector of transistor T2 is applied through diode D7, and terminal TB is prevented from going negative. Transistor T3 continues to conduct, and relay S is held in the marking condition. The reason for this will become more apparent hereinafter.

*Flip-Flop Control*

The outward flow of space signals from the hub to the send relay S, associated with each coupling unit, is controlled by a flip-flop circuit comprising transistors T1 and T2. This circuit is bistable being arranged in the usual Eccles-Jordan configuration by means of the cross-coupling resistor R9 which interconnects the collector of transistor T1 to the base of transistor T2 together with resistors R10 and R16 which interconnect the collector of transistor T2 to the base of transistor T1. Resistors R5 and R7 provide a 10,000-ohm positive 20-volt collector load for transistor T1. Resistors R6 and R8 provide a 5,000-ohm positive 15-volt collector load for transistor T2. The emitter of transistor T2 connects to a negative potential source, which may be negative 6 volts, for instance, consisting of Zener diode D5 back biased by current from a negative source through resistor R4. The emitter of transistor T1 connects to the receiving leg RL by means of the resistor network R11, R12 and R13 and has voltages of zero volts for marking and negative 40 volts for spacing.

For a marking signal condition on both the receiving leg RL and on the common receiving hub RH the flip-flop circuit can stand in either one of its two bistable conditions. For instance, if transistor T1 is conducting its collector voltage will be near zero. The coupling to the base of transistor T2 consisting of resistors R9 and R15 will present a negative 15-volt potential to the base of transistor T2 holding it cut off. The collector voltage of transistor T2 will be near positive 15 volts and in turn will feed base current to transistor T1 through resistors R10 and R16 holding transistor T1 conducting. On the other hand, if transistor T1 is cut off its collector voltage will be about positive 17 volts and base current will flow into transistor T2 causing it to conduct. The collector voltage of transistor T2 will be near −6 volts and in turn will hold transistor T1 cut off through resistors R10 and R16.

When a spacing signal is applied to the receiving leg RL from relay R, the potential of the emitter of transistor T1 goes to negative 40 volts. The negative 30-volt potential of the receiving hub RH is applied through diode D2 to terminal TC. Transistor T1 is thus caused to conduct, if it had not been previously conducting and transistor T2 cuts off. At the end of the spacing signal interval from relay R, the emitter of transistor T1 returns to zero volts and the received hub returns to positive 60 volts. Diode D2 is then back biased and terminal TC is isolated from the receiving hub RH. The collector voltage of transistor T2, being near positive 15 volts, then serves to maintain transistor T1 in a conducting state. The combination of diode D4 and capacitor C1 connected from the emitter of transistor T1 to ground, slows the return of the emitter voltage from negative 40 volts back to zero. This assures that the potential of terminal TC will rise more rapidly than that of the emitter of transistor T1 even with maximum capacitance conditions on the receiving hub. Consequently, transistor T1 conducts continuously during periods of inward transmission from relay R and transistor T2 is cut off, keeping terminal TB near positive 12 volts and maintaining relay S in the marking condition. Resistor R14 enables capacitor C1 to assume a negative 40-volt condition during a spacing signal condition on the receiving leg RL.

When relay R connected to one coupling circuit is in the marking condition and a corresponding relay connected to a second coupling circuit is actuated to the spacing condition and thereby applies a negative 30-volt spacing condition on the common receiving hub RH to which both coupling circuits are connected, the potential of terminal TC in the coupling circuit shown in FIG. 1 changes to negative 30 volts. With the emitter of transistor T1 at zero volts, transistor T1 is cut off, if it had not been cut off previously, and transistor T2 conducts. The collector of transistor T2 falls to negative 6 volts and permits a spacing condition from the sending hub to reach transistor T3 and to operate relay S to the spacing condition. When the assumed spacing condition incoming from the second relay R is removed from the common receiving hub RH, terminal TC is again isolated from the positive 60-volt marking condition by diode D2 and the negative 6-volt potential at the collector of transistor T2 serves to maintain transistor T1 cut off. Thus, for periods of outward transmission, transistor T2 in the coupling unit shown in FIG. 1 conducts continuously and a negative 6-volt potential is applied to the upper terminal of diode D7, keeping the outward path through transistor T3 unblocked. When a regenerative repeater is used, the delayed spaces at its output are able to reach transistor T3 because of this memory feature incorporated in the flip-flop circuit which informs transistor T3 that the last spacing condition on the receiving hub RH was received from a relay corresponding to relay R associated with some other hub coupling circuit.

When relay R is in the spacing condition, transistor T1 will be conducting as previously described. If in this condition a second receiving leg such as receiving leg RL also applies a spacing signal condition to the common receiving hub RH, thereby producing a negative 60-volt double-space condition, terminal TC will be held at negative 60 volts. With the emitter of transistor T1 at negative 40 volts, transistor T1 will be cut off and transistor T2 will conduct, permitting a spacing signal condition to reach relay S. Thus, a spacing signal condition from a second branch is accepted even when a spacing signal condition is being applied through the receiving leg shown in FIG. 1. If the spacing signal condition from the second branch is terminated before the spacing condition through receiving leg RL in FIG. 1 is terminated, the common receiving hub RH returns to the negative 30-volt condition, terminal TC returns to negative 30 volts and transistor T1 again conducts in turn cutting off transistor T2. This results again in the blocking of a spacing signal condition incoming through receiving leg RL of the circuit of FIG. 1 from reaching relay S.

It will be seen that this action permits full-duplex transmission between two coupling circuits of the type described herein. The reason for this is that the path from the hub through any sending leg to any repeater, say repeater A, is open while a single space from any other repeater, say repeater B, is on the hub. The path from the hub through the sending leg to repeater A is open also when repeater A and repeater B are both transmitting a spacing signal toward the hub simultaneously. The path from the hub through the sending leg of repeater A, while repeater A is transmitting toward the hub simultaneously with any other repeater, say repeater B, is blocked only while a single space from its own receiving leg is on the hub.

Thus while repeater A transmits toward the hub, the path from the hub through the sending leg of repeater A will be blocked only against spaces transmitted by itself toward the hub, while no other repeater is impressing a space on the hub at the same instant. While repeater A is transmitting toward the hub, the path through its sending leg will be open only at any time a spacing signal from another repeater appears on the hub. Because of the almost instantaneous action of the present coupling unit, when any one repeater, such as repeater A, and any other single repeater transmit simultaneously toward the hub, each spacing signal in its entirety from the other repeater will be received by repeater A and no portion of any spacing signal from repeater A will be returned to repeater A. Thus whether or not spacing signals from repeaters A and B partially overlap in either direction on the hub will be without effect on the reception of each space from the other repeater in its entirety. This permits any two circuits to intercommunicate effectively at the same time. Such transmission is limited to two circuits only. Other branches during such full-duplex transmission will, of course, get spaces from both transmitting branches and garbled copy will result.

If it is required that a station should be able to transmit to all of the other stations in a hub network simultaneously, and at the same time that the station should be able to receive from any other station connected to the hub network, two hubs are required to afford what is known in the art as full-duplex hub circuit operation. Under this system of operation, a station is connected to one hub so that it may transmit toward the hub and is provided with a separate branch connected to a second hub so that it may receive therefrom. A hub potentiometer is connected to the receiving hub RH which affords potentials of negative 10 volts for the marking condition and negative 60 volts for the spacing condition. Under these conditions terminal TC is always negative with respect to the emitter of transistor T2 so that the outward path through transistor T3 is always open. If it were not necessary to provide full-duplex connections, the voltage swing at terminal TC could be reduced by employing a Zener diode as diode D2. Such a diode would afford a substantial voltage drop across it, for instance, a drop of 20 volts. This would reduce the space and double-space voltages at terminal TC to negative 10 volts and negative 40 volts, for instance. The emitter voltages of transistor T1 could then be zero volts for mark and negative 20 volts for space, which would reduce the maximum collector voltage from negative 57 to negative 37 volts. In either case, however, transistor T1 should preferably be a silicon transistor to afford a high collector voltage characteristic.

Figure 2:
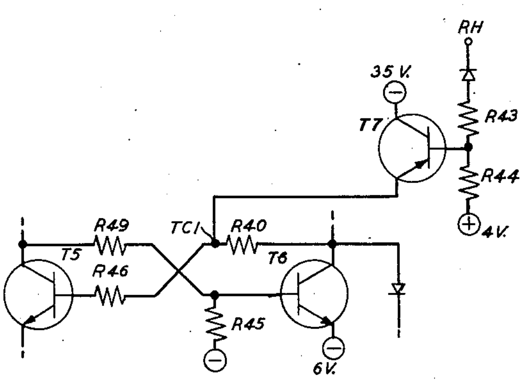
FIG. 2 shows a modification of FIG 1.

Refer now to FIG. 2 which shows a modification of the circuit of FIG. 1. In this modification transistor T5 corresponds to transistor T1, transistor T6 corresponds to transistor T2, transistor T3 is not shown and a transistor has been added, transistor T7. Four transistors would therefore be required in the arrangement of FIG. 2 rather than three as in FIG. 1. In FIG. 2 the common receiving hub RH is coupled to terminal TC1, which corresponds to terminal TC in FIG. 1, in a different manner than in FIG. 1 to improve the voltage conditions applied to the circuit. The negative receiving hub voltages are attenuated by voltage divider R43—R44 and repeated to terminal TC1 by another transistor T7 acting as an emitter follower. Terminal TC1 can become negative with respect to the junction of resistors R43 and R44 but cannot become positive. This arrangement permits voltages such as zero volts and negative 20 volts at the emitter of transistor T5, which corresponds to transistor T1 in FIG. 1.

What is claimed is:

A hub telegraph repeater system, having a plurality of telegraph repeaters, a corresponding plurality of hub coupling units, a hub, each of said repeaters connected through an individual receiving leg is a respective coupling unit to said hub, for transmitting marking and spacing signals from a repeater through its respective hub coupling unit to said hub, an individual sending leg interconnecting each of said repeaters through its said respective hub coupling unit to said hub, for transmitting marking and spacing signals from said hub through said sending legs simultaneously to said repeaters, in response to said signals impressed on said hub through any of said sending legs, each of said units having a transistor flip-flop locking circuit, said locking circuit having means responsive to marking and spacing signals incoming through the receiving leg of its respective unit for preventing transmission back through the sending leg of the same unit, said flip-flop locking circuit means comprising a first transistor having an input circuit, joint control means for controlling said input circuit in response to signals impressed on its respective receiving leg and in response to signals thereby produced on said receiving hub, a second transistor responsive to said first transistor, an output circuit for said second transistor connecting said second transistor to the sending leg of its respective coupling unit, to control transmission therethrough, and a delay circuit connected to the input of said first transistor to prevent its response to a change from a spacing to a marking condition of its respective receiving leg, when signals are being transmitted therethrough toward the receiving hub.

References Cited in the file of this patent

UNITED STATES PATENTS

| | | |
|---|---|---|
| 2,558,197 | Rea | June 26, 1951 |
| 2,607,852 | Rea | Aug. 19, 1952 |
| 2,612,560 | Rea | Sept. 30, 1952 |
| 2,636,942 | Dabey | Apr. 28, 1953 |

OTHER REFERENCES

Publication: "Electronic and Radio Engineering," by F. E. Terman, McGraw-Hill Book Co., Fourth Edition, copyright 1955, pp. 632, 633, 777–781, 795 and 796.